(12) United States Patent
Stothers et al.

(10) Patent No.: US 11,453,505 B2
(45) Date of Patent: Sep. 27, 2022

(54) ICE PROTECTION SYSTEM

(71) Applicants: Ultra Electronics Limited, London (GB); University of Southampton, Southampton (GB)

(72) Inventors: Ian Stothers, Cambridge (GB); Tim Waters, Stockbridge (GB)

(73) Assignees: Ultra Electronics Limited, London (GB); University of Southampton, Southampton (GB)

( * ) Notice: Subject to any disclaimer, the term of this patent is extended or adjusted under 35 U.S.C. 154(b) by 273 days.

(21) Appl. No.: 16/618,758

(22) PCT Filed: May 31, 2018

(86) PCT No.: PCT/GB2018/051474
§ 371 (c)(1),
(2) Date: Dec. 2, 2019

(87) PCT Pub. No.: WO2018/220370
PCT Pub. Date: Dec. 6, 2018

(65) Prior Publication Data
US 2020/0130850 A1 Apr. 30, 2020

(30) Foreign Application Priority Data

Jun. 1, 2017 (GB) .................................... 1708766

(51) Int. Cl.
*B64D 15/16* (2006.01)
*B64F 5/30* (2017.01)
*B08B 7/02* (2006.01)

(52) U.S. Cl.
CPC .............. *B64D 15/163* (2013.01); *B08B 7/02* (2013.01); *B64F 5/30* (2017.01)

(58) Field of Classification Search
None
See application file for complete search history.

(56) References Cited

U.S. PATENT DOCUMENTS

| | | | |
|---|---|---|---|
| 4,461,178 | A | 7/1984 | Chamuel |
| 9,327,839 | B2 | 5/2016 | Giles et al. |
| 2009/0224104 | A1 | 9/2009 | Tenebre et al. |
| 2010/0031972 | A1 | 2/2010 | Royer, Jr. et al. |
| 2010/0294882 | A1 | 11/2010 | Gantie et al. |
| 2016/0023772 | A1 | 1/2016 | Borigo et al. |
| 2017/0144199 | A1 | 5/2017 | Caspari et al. |
| 2018/0079492 | A1 | 3/2018 | Seidel et al. |

FOREIGN PATENT DOCUMENTS

| | | |
|---|---|---|
| CA | 2770812 C | 8/2013 |
| WO | WO 2012/051717 A1 | 4/2012 |
| WO | WO 2015/190734 A1 | 12/2015 |
| WO | WO 2016/184676 A1 | 11/2016 |

*Primary Examiner* — Eric W Golightly
(74) *Attorney, Agent, or Firm* — Blank Rome LLP

(57) ABSTRACT

We describe an ice protection system used for removing ice and/or other accretions from a structure. An actuator, coupled to a structure, is driven to generate vibrations in the structure. A controller drives the actuator using a signal that comprises a frequency chirp over a first period of time, and the controller controls the frequency chirp and the first period such that vibrations generated in the structure by the actuator propagate through the structure to coincide at a desired area of the structure remote from the actuator to remove ice and/or other accretions from the desired area of the structure.

35 Claims, 6 Drawing Sheets

Time

Time

ICE PROTECTION SYSTEM

FIELD OF THE INVENTION

The present invention relates to ice protection systems used for removing ice and/or other accretions from a structure, in particular the present invention relates to ice protection systems that use vibrations to remove ice and/or other accretions from the structure.

BACKGROUND OF THE INVENTION

Low power ice protection has been attempted previously by generating large dynamic responses of the structure causing the bond between the structure and ice and other accretions to be broken. Approaches can be categorised as either shock or vibration based:

In shock based systems, a shock excitation is induced, typically by passing high electrical currents through conductors in close proximity (electro-expulsion). This can create a high impulsive response but typically only local to the actuator. Its indiscriminate action is also a concern from a viewpoint of structural integrity and the bond between the actuator and the structure can be compromised.

In vibration based systems, high amplitude steady state vibration is generated at a single frequency, typically by piezoelectric actuators. Large AC voltages are applied to the electrodes to generate large oscillatory mechanical strains. The frequency chosen usually corresponds to a resonance of the actuator which, in the case of piezoelectric actuators, is typically ultrasonic (tens of kHz). There is little control over where the large strains occur. Furthermore, driving such an actuator hard at resonance causes it to heat up, crack and/or break off the surface.

We have therefore identified a need for an alternative ice protection system.

SUMMARY OF THE INVENTION

The present invention therefore provides an ice protection system for removing ice and/or other accretions from a structure, the system comprising: an actuator coupled to the structure, the actuator being configured to generate vibrations in the structure; a controller connected to the actuator for driving the actuator to cause vibrations in the structure, the controller being configured to generate a drive signal for driving the actuator, the controller drive signal comprising a frequency chirp over a first period of time, wherein the controller controls the frequency chirp and the first period such that vibrations generated in the structure by the actuator propagate through the structure to coincide at a desired area of the structure remote from the actuator to remove ice from the desired area of the structure.

By contrast to the known prior art solutions, the invention outlined here is able to generate a controlled shock response at a specified target position on the structure using vibration actuators and the dispersive properties of the structure. By using a chirped drive signal combined with the dispersive properties of the structure, the vibrations coincide at the desired target area. Since a chirped drive signal is used, the response at the input position (i.e. at the site of the actuator) is significantly lower than the response at the desired target position, and is also much less at the actuator than when compared to prior art (shock and vibration) systems, as the input response is spread over a greater period of time.

Furthermore, the target position can be varied in almost real time by adjusting the signals chosen to drive the actuators.

The controller may be configured to generate the drive signal as a sequence of pulses that switches between a fixed positive and fixed negative value.

It has been found that implementing the modified drive signal greatly increases the peak response at the desired target area compared to one without such a modified signal. Advantageously this also means that the actuators can be driven using a switched amplifier.

The controller may shorten the width of one or more pulses in the drive signal between respective zero-crossing positions. The controller may shorten the pulse widths of pulses relating to frequencies of the drive signal that are at or adjacent one or more resonant frequencies of the actuator.

In any of the above, the ice protection system may comprise one or more sensors for sensing vibrations in the structure, the one or more sensors being connected to the controller and the controller being configured to receive vibration data from the one or more sensors, and the one or more sensors being located at or adjacent the desired area of the structure, and/or between the actuator and the desired area, and/or beyond the desired area of the structure.

In such a system, the controller may be configured to generate the drive signal based on the vibration data received from the one or more sensors.

The controller may be configured to generate the drive signal by: driving the actuator with a calibration pulse to cause vibrations in the structure; receiving vibration data from the one or more sensors due to the vibrations in the structure caused by the calibration pulse; processing the received vibration data to generate the drive signal. The vibration data may comprise a frequency chirp over a period of time, and processing the received vibration data comprises time reversing the vibration data.

When the sensor is located between the actuator and the desired area, the controller may be configured to extrapolate the vibration data at the desired area based on the vibration data received from the sensor, and wherein the controller generates a drive signal using the extrapolated vibration data.

When the sensor is located beyond the desired area, the controller may be configured to interpolate the vibration data at the desired area based on the vibration data received from the sensor, and wherein the controller generates a drive signal using the interpolated vibration data.

The ice protection system may comprise a plurality of actuators, each of the actuators being coupled to different areas of the structure and each of the actuators being configured to generate vibrations in the structure, wherein the controller is connected to each of the actuators for driving each of the actuators to cause vibrations in the structure, the controller being configured to generate a plurality of drive signals, one for each of the actuators, each of the plurality of drive signals comprising a respective frequency chirp over a respective period of time, wherein the controller controls the frequency chirp and the first period of each of the drive signals such that vibrations generated in the structure by the one or more actuators propagate through the structure to coincide at a desired area of the structure remote from the one or more actuators to remove ice from the desired area of the structure.

In such an arrangement, the system may comprise one or more sensors for sensing vibrations in the structure, the one or more sensors being connected to the controller and the controller being configured to receive vibration data from the one or more sensors, and the one or more sensors being located at or adjacent the desired area of the structure, and/or between the actuator and the desired area, and/or beyond the desired area of the structure.

The controller may be configured to generate the drive signal based on the vibration data received from the one or more sensors.

The controller may be configured to generate the drive signal by: for each actuator, driving the actuator with a calibration pulse to cause vibrations in the structure; for each calibration pulse, receiving vibration data from the one or more sensors due to the vibrations in the structure caused by the calibration pulse from the actuator; for each of the received vibration data, processing the received vibration data to generate the drive signal for each of the plurality of actuators. The vibration data may comprise a frequency chirp over a period of time for each of the plurality of actuators, and processing the received vibration data comprises time reversing the vibration data for each of the plurality of actuators.

When the sensor is located between the respective actuator and the desired area, the controller may be configured to extrapolate the vibration data at the desired area based on the vibration data received from the sensor, and the controller generates a respective drive signal using the extrapolated vibration data.

When the sensor is located beyond the desired area, the controller may be configured to interpolate the vibration data at the desired area based on the vibration data received from the sensor, and the controller generates a respective drive signal using the extrapolated vibration data.

In any of the above, the system may comprise a switched amplifier between the controller and the actuator.

The present invention also provides a method of removing ice and/or other accretions from a structure, comprising: attaching an actuator to a structure, the actuator being configured to cause vibrations in the structure; generating a drive signal to drive the actuator, the drive signal comprising a frequency chirp over a first period of time; and driving the actuator with the drive signal to cause the structure to vibrate, wherein the frequency chirp and the first period are controlled such that the vibrations generated by the actuator propagate through the structure and coincide at a desired area of the structure remote from the actuator to remove ice from the desired area of the structure.

By contrast to the known prior art solutions, the invention outlined here is able to generate a controlled shock response at a specified target position on the structure using vibration actuators and the dispersive properties of the structure. By using a chirped drive signal combined with the dispersive properties of the structure, the vibrations coincide at the desired target area. Since a chirped drive signal is used, the response at the input position (i.e. at the site of the actuator) is significantly lower than the response at the desired target position, and is also much less at the actuator than when compared to prior art (shock and vibration) systems, as the input response is spread over a greater period of time.

Furthermore, the target position can be varied in almost real time by adjusting the signals chosen to drive the actuators.

The drive signal may be generated as a sequence of pulses that switch between a fixed positive and fixed negative value.

It has been found that implementing the modified drive signal greatly increases the peak response at the desired target area compared to one without such a modified signal. Advantageously this also means that the actuators can be driven using a switched amplifier.

The width of one or more pulses in the drive signal may be shortened between respective zero-crossing positions. The pulse widths of pulses relating to frequencies of the drive signal that are at or adjacent one or more resonant frequencies of the actuator may be shortened.

The method further comprises: providing one or more sensors for sensing vibrations in the structure, the one or more sensors being located at or adjacent the desired area of the structure, and/or between the actuator and the desired area, and/or beyond the desired area; and receiving vibration data from the one or more sensors in response to vibrations in the structure caused by the actuator.

The drive signal may be generated based on the vibration data received from the one or more sensors.

The drive signal may be generated by: driving the actuator with a calibration pulse to cause vibrations in the structure; receiving vibration data from the one or more sensors due to the vibrations in the structure caused by the calibration pulse; processing the received vibration data to generate the drive signal. The vibration data may comprise a frequency chirp over a period of time, and processing the received vibration data comprises time reversing the vibration data.

When the sensor is located between the actuator and the desired area, the method may comprise: extrapolating the vibration data at the desired area based on the vibration data received from the sensor; and generating the drive signal using the extrapolated vibration data.

When the sensor is located beyond the desired area, the method may comprise: interpolating the vibration data at the desired area based on the vibration data received from the sensor; and generating the drive signal using the interpolated vibration data.

The method may also comprise providing a plurality of actuators, each of the actuators being coupled to different areas of the structure and each of the actuators being configured to generate vibrations in the structure, wherein generating a drive signal to drive the actuator comprises generating a plurality of drive signals, one for each of the plurality of actuators, each of the plurality of drive signals comprising a respective frequency chirp over a respective period of time, wherein driving the actuator with the drive signal comprises driving each of the plurality of actuators with a respective drive signal to cause the structure to vibrate, and wherein the wherein the frequency chirp and the first period of each of the drive signals are controlled such that the vibrations generated by the plurality of actuators propagate through the structure and coincide at a desired area of the structure remote from the actuators to remove ice from the desired area of the structure.

In this multi-actuator arrangement, the method may comprise: providing one or more sensors for sensing vibrations in the structure, the one or more sensors being located at or adjacent the desired area of the structure, and/or between the actuator and the desired area, and/or beyond the desired area; and receiving vibration data from the one or more sensors in response to vibrations in the structure caused by the actuator.

The drive signal may be generated based on the vibration data received from the one or more sensors.

The drive signal may be generated by: for each actuator, driving the actuator with a calibration pulse to cause vibrations in the structure; for each calibration pulse, receiving vibration data from the one or more sensors due to the vibrations in the structure caused by the calibration pulse from the actuator; for each of the received vibration data, processing the received vibration data to generate the drive signal for each of the plurality of actuators. The vibration data may comprise a frequency chirp over a period of time for each of the plurality of actuators, and processing the received vibration data comprises time reversing the vibration data for each of the plurality of actuators.

When the sensor is located between the respective actuator and the desired area, the method may comprise: extrapolating the vibration data at the desired area based on the vibration data received from the sensor; and generating the drive signal using the extrapolated vibration data.

When the sensor is located beyond the desired area, the method comprises: interpolating the vibration data at the desired area based on the vibration data received from the sensor; and generating the drive signal using the interpolated vibration data.

In any of the above systems and methods, the accretions may comprise dust, dirt, or other detritus.

In any of the above systems and methods, the structure comprises an aircraft.

LIST OF FIGURES

The present invention will now be described, by way of example only, and with reference to the accompanying figures, in which.

DETAILED DESCRIPTION OF THE PREFERRED EMBODIMENTS

In brief, the present invention relates to an ice protection system in which an actuator, coupled to a structure, is driven to generate vibrations in the structure. A controller drives the actuator using a signal that comprises a frequency chirp over a first period of time, and the controller controls the frequency chirp and the first period such that vibrations generated in the structure by the actuator propagate through the structure to coincide at a desired area of the structure remote from the actuator to remove ice and/or other accretions from the desired area of the structure.

By contrast to the known prior art solutions, the invention outlined here is able to generate a controlled shock response at a specified target position on the structure using vibration actuators and the dispersive properties of the structure. By using a chirped drive signal combined with the dispersive properties of the structure, the vibrations coincide at the desired target area. Since a chirped drive signal is used, the response at the input position (i.e. at the site of the actuator) is significantly lower than the response at the desired target position, and is also much less at the actuator than when compared to prior art (shock and vibration) systems, as the input response is spread over a greater period of time.

Furthermore, the target position can be varied in almost real time by adjusting the signals chosen to drive the actuators. A scan can therefore be performed to de-ice an area of the structure. Any actuator technology can be used that faithfully excites the structure over a broad range of frequencies. The frequency range can be chosen according to the actuator technology adopted.

Figure 1A:
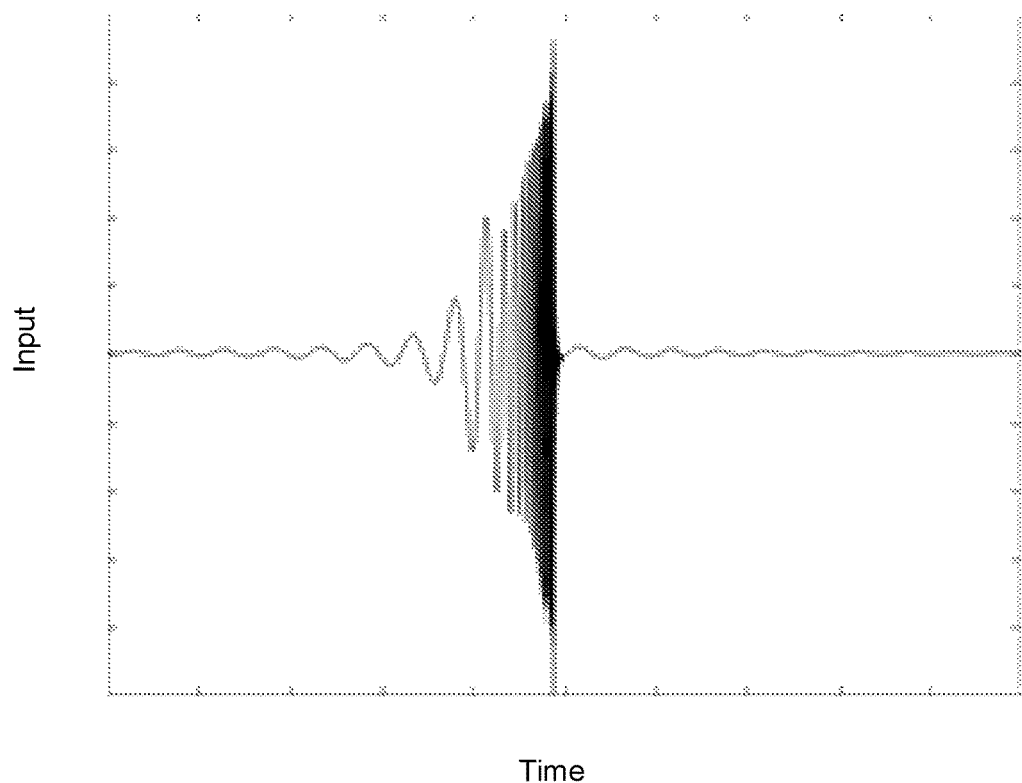
FIG. 1a shows an input to an actuator.
Figure 1B:
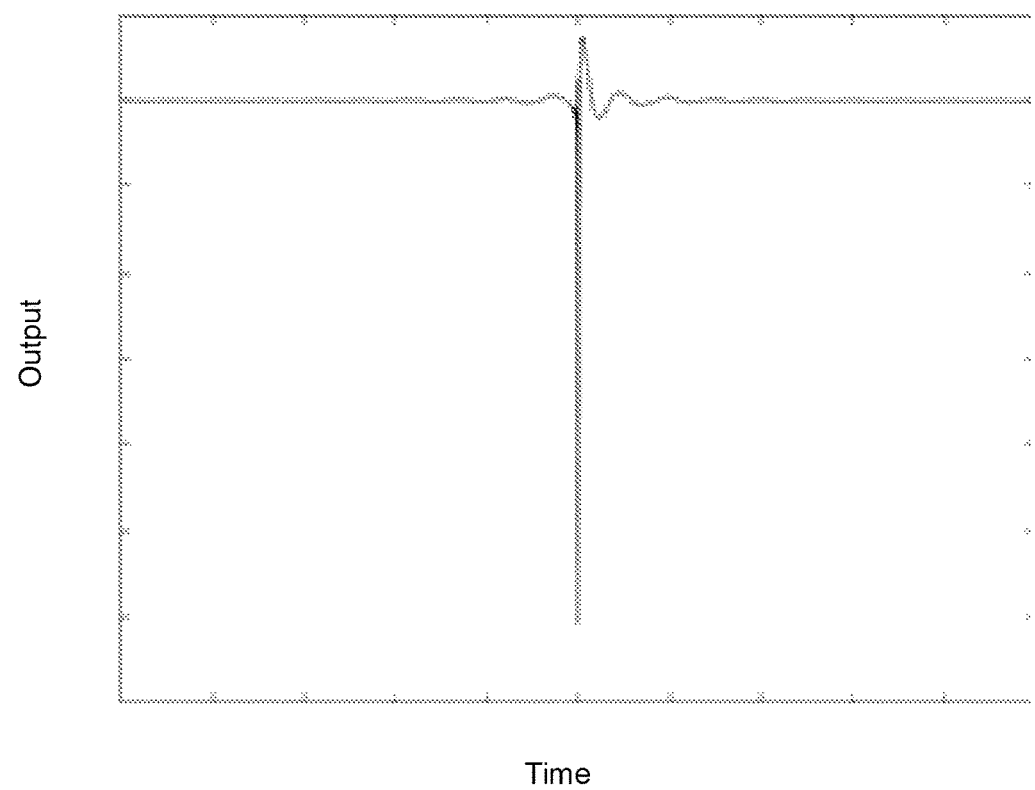
FIG. 1b shows a response at a desired area of a structure in response to the actuator input 1b.

The invention exploits the 'dispersive' nature of waves in structures, i.e. that different frequencies propagate at different speeds. The usual manifestation of this phenomenon is that a short pulse-like input to a structure at one position does not result in a short impulsive response at a remote position because the arrival times of the various frequency components in the pulse are spread out. In order to achieve an impulsive response at a desired location one must instead choose an input that is not itself impulsive but staggers the launch times of the various frequencies so as to give slower frequencies a "head start", see FIG. 1a. All frequencies are arranged to arrive at the same "focal point" at the same instant, see FIG. 1b. The response at the input position, however, is modest by comparison because it is much longer in duration.

Figure 2:
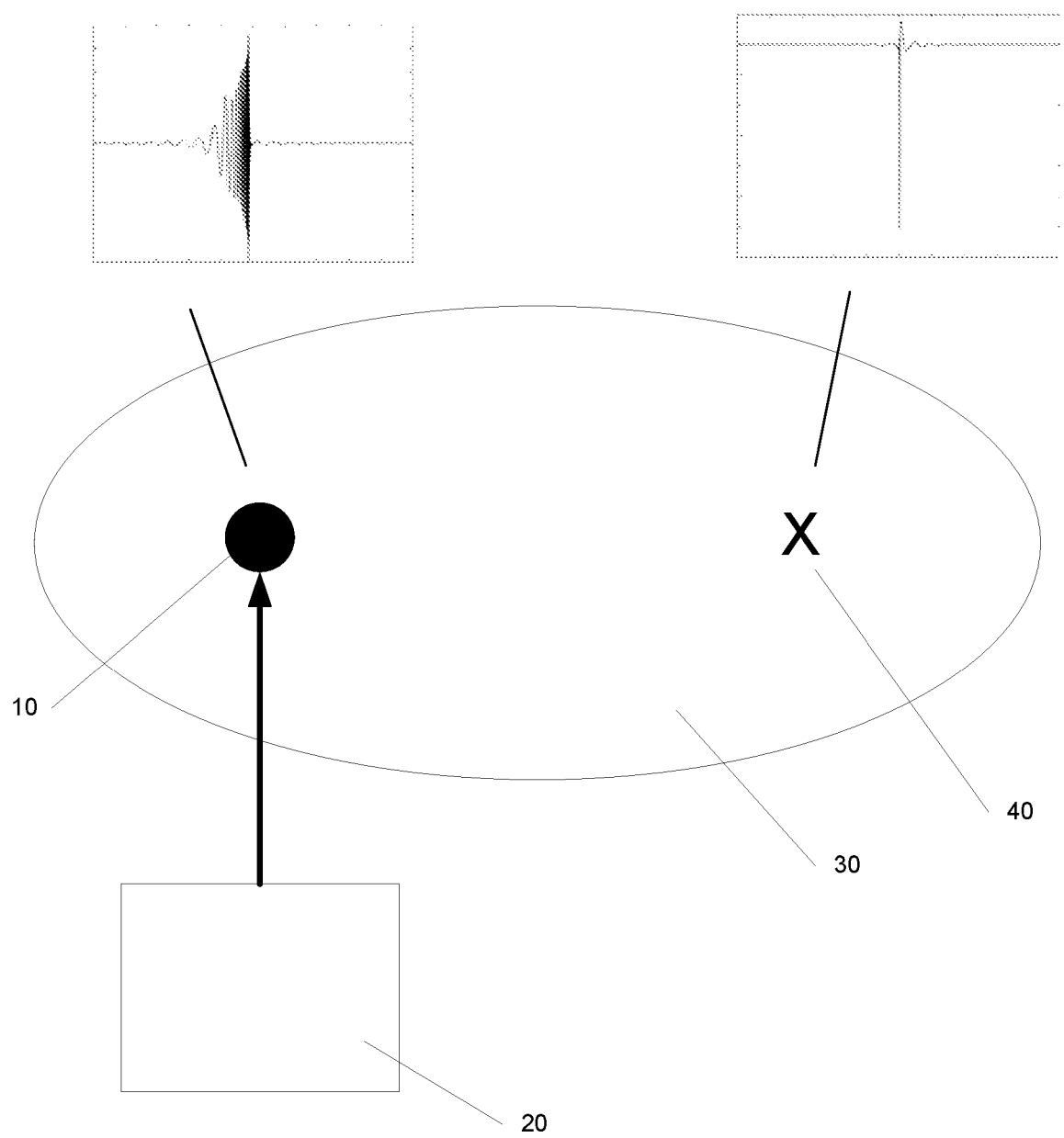
FIG. 2 shows an ice protection system with one actuator.

FIG. 2 illustrates the ice protection system in its most fundamental form. An actuator 10 is coupled to the structure 30 where the actuator, when driven, generates vibrations in the structure which will travel through the structure.

A controller 20 is connected to the actuator to generate and to provide the appropriate driving signal to the actuator to cause vibrations in the structure. Given the dispersive properties of the structure 30, the controller generates a drive signal that comprises a frequency chirp over a first period of time. In this way, the vibration waves will travel at different speeds to reach a desired target location 40 on the structure 30.

With knowledge of the dispersive properties of the structure 30 (e.g. the frequency response based on the location of the actuator and the desired target area of the structure), the controller can control the frequency chirp (start frequency, end frequency, chirp rate, period or duration etc.) such that vibrations generated in the structure by the actuator propagate through the structure to coincide at a desired area of the structure remote from the actuator to remove ice and/or other accretions from the desired area of the structure. That is, at the desired target area, the vibration waves constructively interfere to generate a response in the structure (or at least the surface of the structure) that is sufficient to dislodge ice and/or other accretions that may have accumulated on the structure at that target area.

Figure 3:
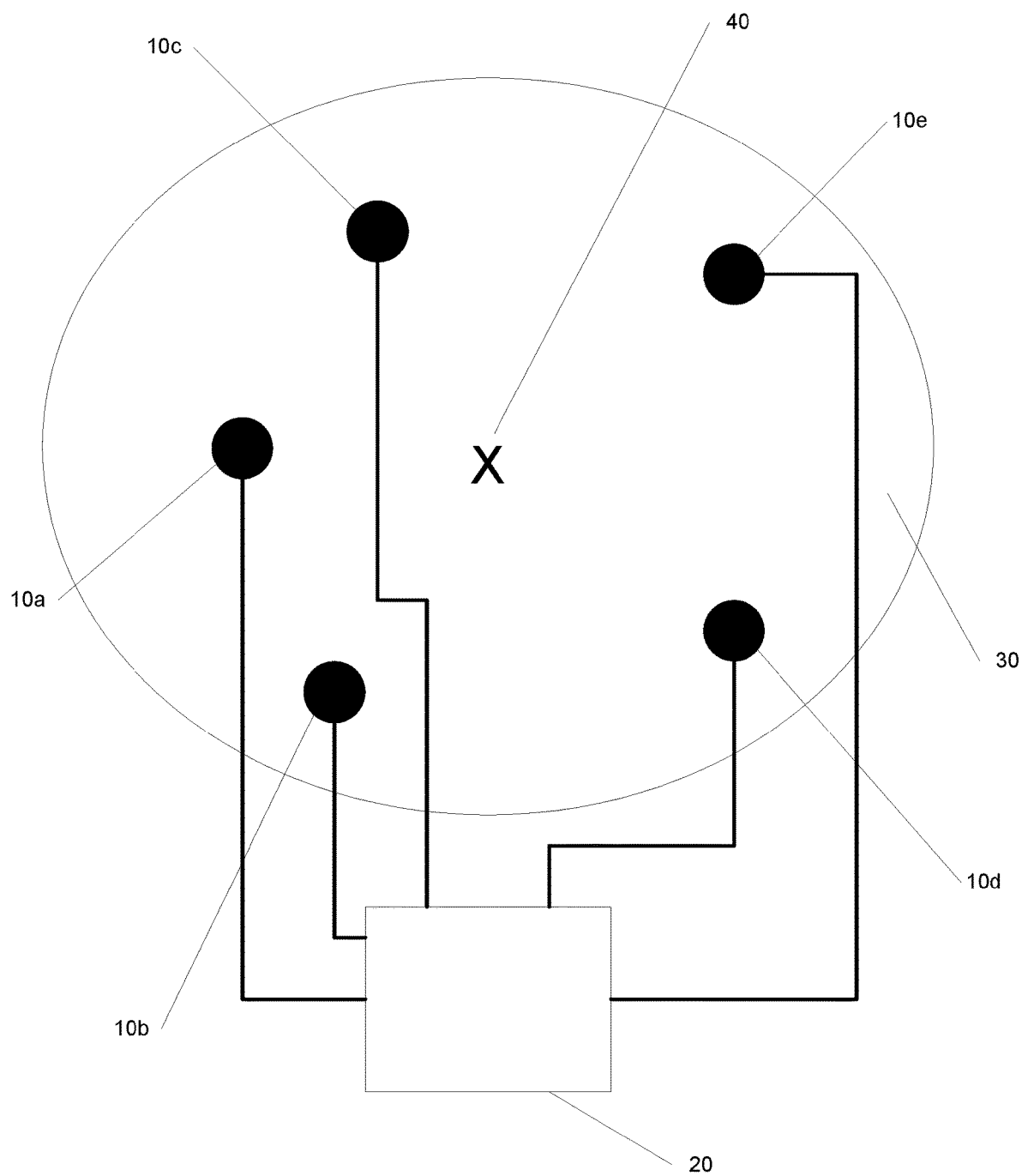
FIG. 3 shows an ice protection system having multiple actuators.

Whilst FIG. 2 shows the ice protection system in its most fundamental form, the system may be designed in order to work with multiple actuators, as shown in FIG. 3.

In FIG. 3, like features are shown with the same or similar reference numerals. In this case, the single actuator 10 of FIG. 2 is replaced with a plurality of actuators 10a-10e. The system is not limited to five actuators, but only five are shown in this example for the sake of clarity.

In the system of FIG. 3, each of the actuators 10a-10e are coupled to different areas of the structure 30 and each of the actuators 10a-10e are connected to the controller 20 and are configured to generate vibrations in the structure in response to a drive signal provided by the controller 20.

As with the system of FIG. 2, the controller 20 of FIG. 3 generates drive signals that comprise a respective frequency chirp over a respective period of time, and the frequency chirp and the first period of the drive signals is controlled such that vibrations generated in the structure by the plurality of actuators propagate through the structure to coincide (and constructively interfere) at a desired target area of the structure remote from the plurality of actuators to remove ice and/or other accretions from the desired area of the structure.

The drive signal may be the same signal provided to each of the actuators 10a-10e. Preferably, a drive signal tailored to the response of the structure at the respective actuator location (and in relation to the desired target area relative to that respective actuator) is provided to each of the actuators 10a-10e. In such a way, vibrations from each of the actuators 10a-10e travel through the structure and are chosen to constructively interfere at the desired target area of the structure to remove ice and/or other accretions from the desired target area.

In a practical situation, the wave speed and frequency response of the structure may not be known with sufficient accuracy in order to generate the required response in the structure. In this case, a calibration or modelling step is preferable, in order for the controller to generate the necessary drive signals.

Figure 4:
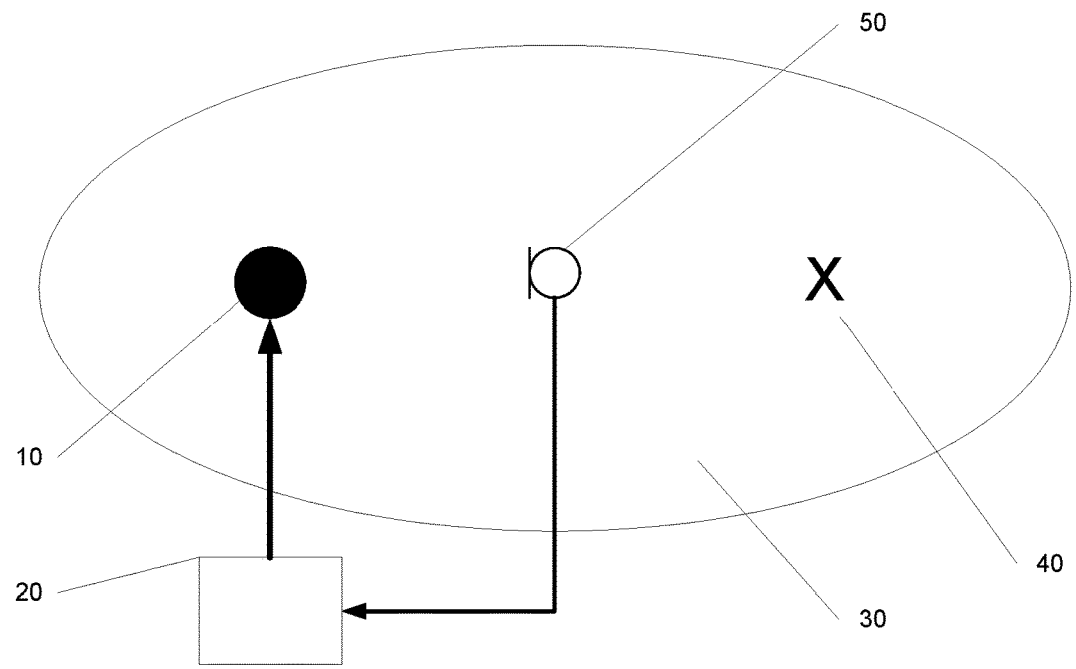
FIG. 4 shows an ice protection system with vibration sensor.
Figure 5:
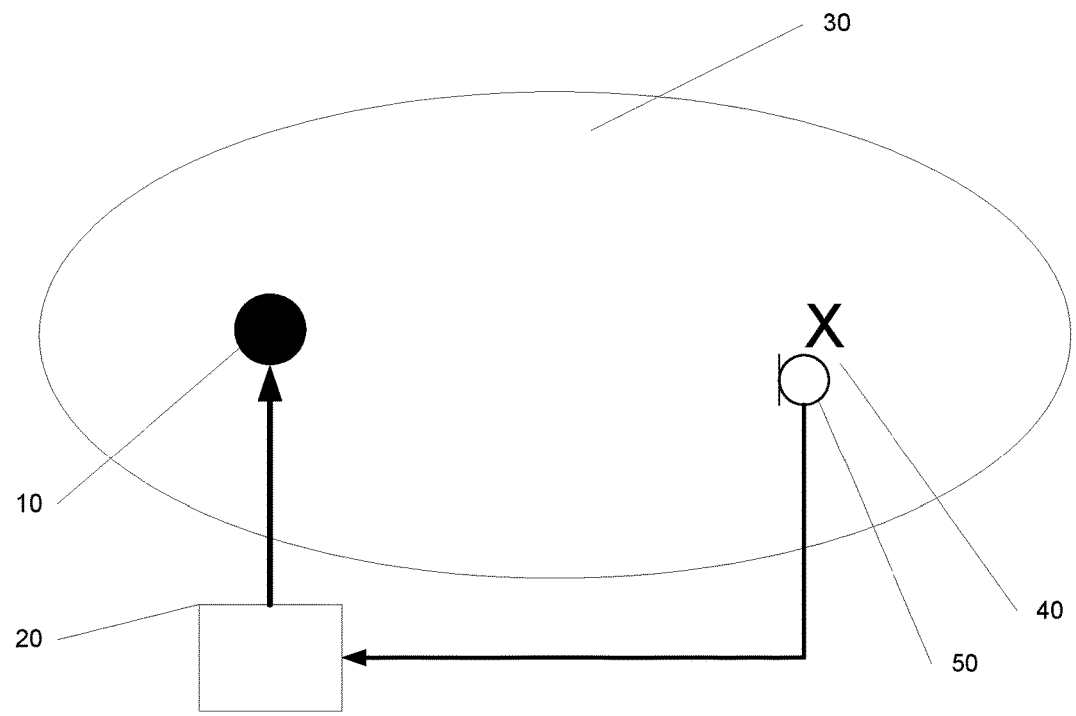
FIG. 5 shows the ice protect system with a vibration sensor in an alternative location relative to the desired target area of the structure.
Figure 6:
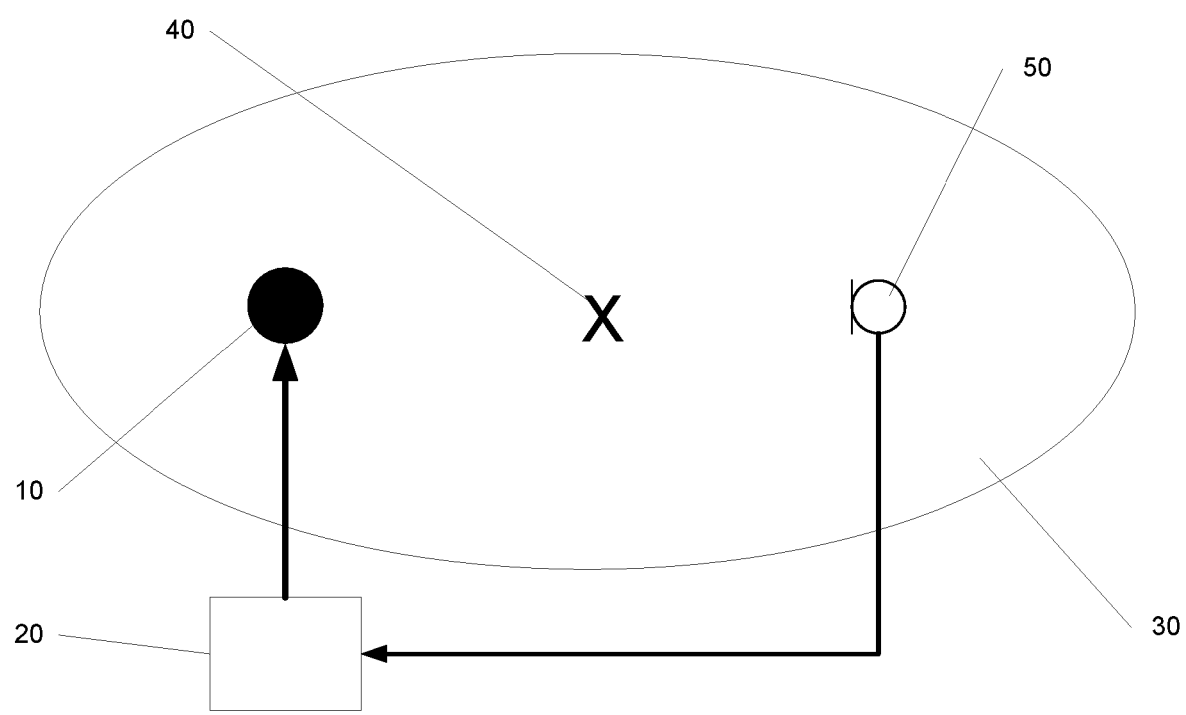
FIG. 6 shows the ice protect system with a vibration sensor in an alternative location relative to the desired target area of the structure.

Such a system is illustrated in FIGS. 4, 5 and 6. In these figures, the fundamental system of FIG. 2 is shown with an additional vibration sensor 50, which is coupled to the controller 20, and the controller is configured to receive vibration signals and/or vibration data from the sensor. In fact, this is an overly simplified version of the system that may be used in practice.

For the sake of clarity, only one vibration sensor 50 is shown. In practice, the system may comprise one sensor, as shown in the configurations illustrated by FIG. 4 (sensor between the actuator and desired target area), FIG. 5 (sensor at or adjacent the target area) and FIG. 6 (sensor positioned beyond the desired target area).

Furthermore, the system in practice may include a plurality of sensors 50 (not shown in the figures for clarity). In this case, the sensors 50 may be position in a combination of the positions discussed above, that is, some may be at or adjacent the target area, some may be beyond the target area, others may be between the target area and the actuator. In any of the above configurations, each of the sensors sends vibration signals and data back to the controller for use in generation of the drive signal(s).

When used on an aircraft (for example on wings or other structures on the aircraft), or other vehicle, the location of the sensors may be inbound and/or outbound of the desired target area.

In the most fundamental configuration (one actuator, one sensor located at or adjacent the target area), the basic principle is to:
 drive the actuator with a calibration signal (for example an impulse of a desired bandwidth) to cause vibrations in the structure;
 receiving vibration data from the sensor due to the vibrations in the structure caused by the calibration signal; and
 processing the received vibration data to generate the drive signal Due to the dispersive properties of the structure, the vibration data will comprise a frequency chirp (a down-chirp in the case of higher frequencies travelling faster, so will arrive sooner) over a period of time.

As such, processing the received vibration data in order to obtain and generate the drive signal may involve time reversal of the signal received at the sensor. That is, when the received signal at the sensor is time reversed ("played back") and input into the actuator at high gain (that is launching lower frequencies first up to the highest frequencies) the chirped response should travel through the structure and coincide and constructively interfere at the desired target area.

The above steps are akin to a characterisation function that may be performed prior to performing the de-icing by driving the actuator with the appropriate signal, as the response launched by the actuator is tailored to the structure to which the system is installed. This characterisation may be performed once prior to use of the ice protection system, or may be performed periodically to ensure that any structural changes are taken into account in the drive signal.

Whilst the characterisation function has been discussed in relation to the arrangement where there is a single sensor at or adjacent the desired target area, the process remains largely the same whether there is a single sensor between the actuator and desired target area, a single sensor beyond the target area, or a system comprising a plurality of sensors in one or more of those positions in relation to the target area.

When there is a single sensor between the actuator and the desired target area, the vibration signal may be processed to extrapolate the vibration data as if it were received at the desired target area.

When there is a single sensor beyond the desired target area, the vibration signal may be processed to interpolate the vibration data as if it were received at the desired target area.

When there is a plurality of sensors at various locations, the above processes may be implemented dependent on the respective sensor's location in relation to the target area. The controller processes the signals from each of the sensors in order to generate the appropriate drive signal to drive the actuator such that the vibrations from the response of the actuator travel through the structure and coincide at the target area.

As discussed above, the ice protection system may also comprise a plurality of actuators. And this arrangement may be implemented with a signal sensor (at or adjacent the target area, between the actuator and target area or beyond the target area), or may be implemented with a plurality of sensors located at various positions relative to the target area (at or adjacent the target area, and/or between the actuator and target area and/or beyond the target area).

In this multiple-actuator configuration, the principle is largely the same as above, however each actuator is driven in turn, and the vibration data for that actuator is received and processed by the controller in turn in order to generate the appropriate drive signal for that respective actuator. Of course, it is also possible that the actuators could be driven in pairs or other groupings, instead of individually.

The required signal can be obtained from multi-channel frequency analysis of the input and response signals. Alternatively, time reversal acoustics can be applied to the response signals. However, one issue that arises with this technique is that the signal from the vibration sensor encapsulates not only the arrival times of various frequencies, but also their relative amplitudes in the response as determined by the filtering characteristics of the structure. When time-reversed, such signals arrange for the various frequencies to arrive at the correct point at the same instant in time but with varying and suboptimal amplitudes. It is therefore advantageous to shape the spectrum of the time-reversed signal so as to maximise the response at all frequencies.

Figure 7:
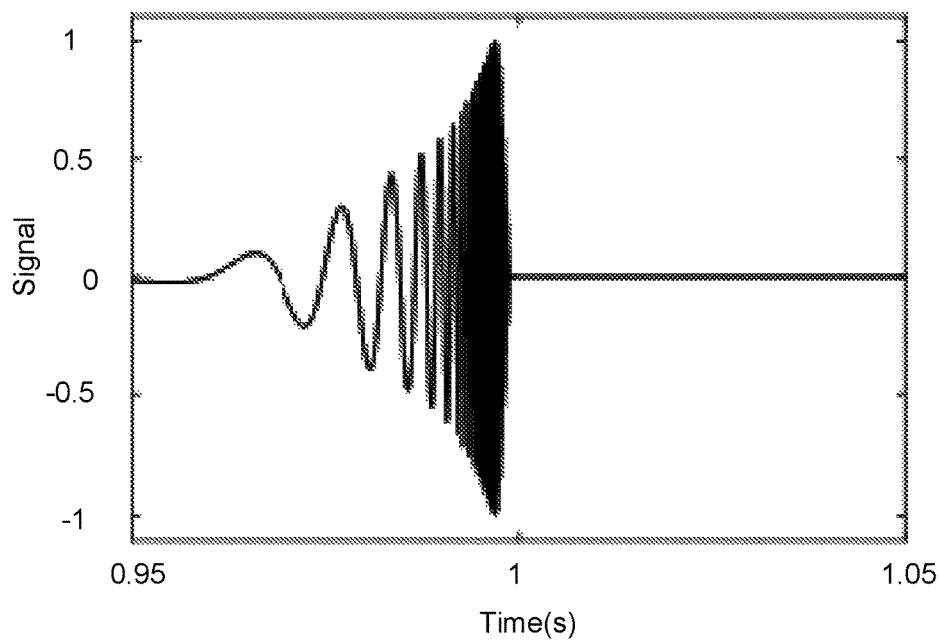
FIG. 7 shows an input response to an actuator.
Figure 8:
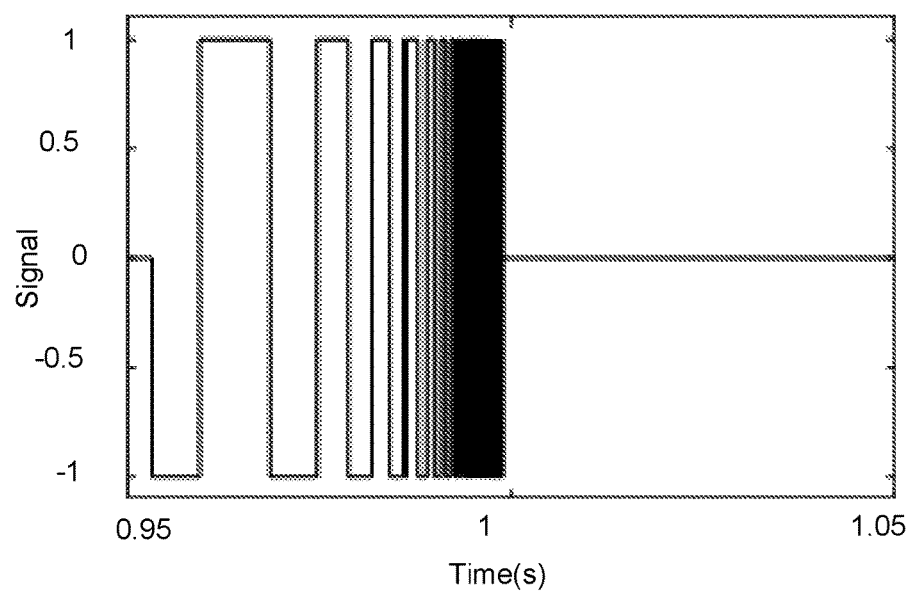
FIG. 8 shows a modified input response to an actuator.
Figure 9:
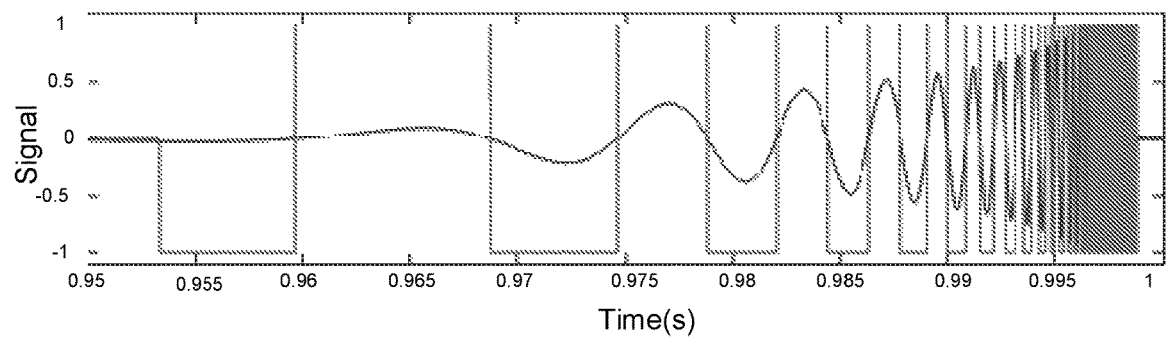
FIG. 9 shows FIGS. 7 and 8 overlaid over a different scale.

In a preferred form, the signal is converted to one that switches between a fixed positive and fixed negative voltage according to the zero crossings of the original signal. See the output in FIG. 7 (original signal), FIG. 8 (modified signal) and FIG. 9 (original and modified overlaid). An additional advantage to this realisation is that the actuators can be driven using a switched amplifier. Whilst in practice the signal may be quite "noisy" (in the sense of harmonics), these are not important to the signal being input into the structure via the actuator. In practice, the harmonics will arrive at the target area at different times to the fundamental signal, but the fundamental signal coincides and constructively interferes at the desired target area.

It has been found that implementing the modified drive signal greatly increases the peak response at the desired target area compared to the original time-reversed signal.

A consequence of using the modified signal, which switches between a maximum positive signal and a maximum negative signal, with a sweeping frequency is that a lot of energy may be supplied to the actuator at a frequency associated with the resonance of the actuator, which may lead to undesirable effects.

If the sweep of frequency is likely to coincide with a resonant frequency of the actuator, the drive signal may additionally be modified at those frequencies to limit the amount of power at the resonant frequencies.

As such, the controller shortens the width of one or more pulses in the drive signal between respective zero-crossing positions. That is, the zero crossing points are retained at their original position, but the time spent at the positive or negative value is reduced, and thus the energy provided to the actuator during those pulses is reduced.

Since the power is reduced in those pulses, the power at those frequencies is reduced, which may prevent the actuator resonating when it is not desired.

In this method, the pulses of the frequencies at or around the resonant frequency or frequencies may be adjusted as described. Alternatively, all pulses may be adjusted in accordance with this method.

No doubt many other effective alternatives will occur to the skilled person. It will be understood that the invention is not limited to the described embodiments and encompasses modifications apparent to those skilled in the art lying within the scope of the claims appended hereto.

The invention claimed is:

1. An ice protection system for removing ice and/or other accretions from a structure, the system comprising:
an actuator coupled to the structure, the actuator being configured to generate vibrations in the structure;
a controller connected to the actuator for driving the actuator to cause vibrations in the structure, the controller being configured to generate a drive signal for driving the actuator, the controller drive signal comprising a time-reversed version of a vibration response of the structure to an impulse vibration input, the time-reversed version of the vibration response having a frequency chirp over a first period of time,
wherein the controller controls the frequency chirp and the first period such that vibrations generated in the structure by the actuator propagate through the structure to coincide at a desired area of the structure remote from the actuator to remove ice from the desired area of the structure.

2. An ice protection system according to claim 1, wherein the controller is configured to generate the drive signal as a sequence of pulses that switches between a fixed positive value and a fixed negative value.

3. An ice protection system according to claim 2, wherein the controller shortens a width of one or more pulses in the drive signal between respective zero-crossing positions.

4. An ice protection system according to claim 3, wherein the controller shortens pulse widths of pulses relating to frequencies of the drive signal that are at or adjacent one or more resonant frequencies of the actuator.

5. An ice protection system according to claim 1, comprising one or more sensors for sensing vibrations in the structure, the one or more sensors being connected to the controller and the controller being configured to receive vibration data from the one or more sensors, and the one or more sensors being located at or adjacent the desired area of the structure, and/or between the actuator and the desired area, and/or beyond the desired area of the structure.

6. An ice protection system according to claim 5, wherein the controller is configured to generate the drive signal based on the vibration data received from the one or more sensors.

7. An ice protection system according to claim 6, wherein the controller is configured to generate the drive signal by:
driving the actuator with a calibration pulse to cause vibrations in the structure;
receiving vibration data from the one or more sensors due to the vibrations in the structure caused by the calibration pulse;
processing the received vibration data to generate the drive signal.

8. An ice protection system according to claim 7, wherein the vibration data comprises a frequency chirp over a period of time, and processing the received vibration data comprises time reversing the vibration data.

9. An ice protection system according to claim 7, wherein, when the sensor is located between the actuator and the desired area, the controller is configured to extrapolate the vibration data at the desired area based on the vibration data received from the sensor, and wherein the controller generates a drive signal using the extrapolated vibration data.

10. An ice protection system according to claim 7, wherein, when the sensor is located beyond the desired area, the controller is configured to interpolate the vibration data at the desired area based on the vibration data received from the sensor, and wherein the controller generates a drive signal using the interpolated vibration data.

11. An ice protection system according to claim 1, comprising a plurality of actuators, each of the actuators being coupled to different areas of the structure and each of the actuators being configured to generate vibrations in the structure,
wherein the controller is connected to each of the actuators for driving each of the actuators to cause vibrations in the structure, the controller being configured to generate a plurality of drive signals, one for each of the actuators, each of the plurality of drive signals comprising a respective frequency chirp over a respective period of time,
wherein the controller controls the frequency chirp and the first period of each of the drive signals such that vibrations generated in the structure by the one or more actuators propagate through the structure to coincide at a desired area of the structure remote from the one or more actuators to remove ice from the desired area of the structure.

12. An ice protection system according to claim 11, comprising one or more sensors for sensing vibrations in the structure, the one or more sensors being connected to the controller and the controller being configured to receive vibration data from the one or more sensors, and the one or more sensors being located at or adjacent the desired area of the structure, and/or between the actuator and the desired area, and/or beyond the desired area of the structure.

13. An ice protection system according to claim 12, wherein the controller is configured to generate the drive signal based on the vibration data received from the one or more sensors.

14. An ice protection system according to claim 13, wherein the controller is configured to generate the drive signal by:
for each actuator, driving the actuator with a calibration pulse to cause vibrations in the structure;
for each calibration pulse, receiving vibration data from the one or more sensors due to the vibrations in the structure caused by the calibration pulse from the actuator;
for each of the received vibration data, processing the received vibration data to generate the drive signal for each of the plurality of actuators.

15. An ice protection system according to claim 14, wherein the vibration data comprises a frequency chirp over a period of time for each of the plurality of actuators, and processing the received vibration data comprises time reversing the vibration data for each of the plurality of actuators.

16. An ice protection system according to claim 14, wherein, when the sensor is located between the respective actuator and the desired area, the controller is configured to extrapolate the vibration data at the desired area based on the vibration data received from the sensor, and the controller generates a respective drive signal using the extrapolated vibration data.

17. An ice protection system according to claim 14, wherein, when the one or more sensors is located beyond the desired area, the controller is configured to interpolate the vibration data at the desired area based on the vibration data received from the one or more sensors, and the controller generates a respective drive signal using the interpolated vibration data.

18. An ice protection system according to claim 1, comprising a switched amplifier between the controller and the actuator.

19. A method of removing ice and/or other accretions from a structure, comprising:
attaching an actuator to a structure, the actuator being configured to cause vibrations in the structure;
generating a drive signal to drive the actuator, the drive signal comprising a time-reversed version of a vibration response of the structure to an impulse vibration input, the time-reversed version of the vibration response having a frequency chirp over a first period of time; and
driving the actuator with the drive signal to cause the structure to vibrate,
wherein the frequency chirp and the first period are controlled such that the vibrations generated by the actuator propagate through the structure and coincide at a desired area of the structure remote from the actuator to remove ice from the desired area of the structure,
wherein a controller is connected to the actuator for driving the actuator to cause vibrations in the structure, the controller being configured to generate the drive signal and to control the frequency chirp and the first period.

20. A method according to claim 19, wherein the drive signal is generated as a sequence of pulses that switch between a fixed positive value and a fixed negative value.

21. A method according to claim 20, wherein a width of one or more pulses in the drive signal is shortened between respective zero-crossing positions.

22. A method according to claim 21, wherein pulse widths of pulses relating to frequencies of the drive signal that are at or adjacent one or more resonant frequencies of the actuator are shortened.

23. A method according to claim 19, comprising:
providing one or more sensors for sensing vibrations in the structure, the one or more sensors being located at or adjacent the desired area of the structure, and/or between the actuator and the desired area, and/or beyond the desired area; and
receiving vibration data from the one or more sensors in response to vibrations in the structure caused by the actuator.

24. A method according to claim 23, wherein the drive signal is generated based on the vibration data received from the one or more sensors.

25. A method according to claim 24, wherein the drive signal is generated by:
driving the actuator with a calibration pulse to cause vibrations in the structure;
receiving vibration data from the one or more sensors due to the vibrations in the structure caused by the calibration pulse;
processing the received vibration data to generate the drive signal.

26. A method according to claim 25, wherein the vibration data comprises a frequency chirp over a period of time, and processing the received vibration data comprises time reversing the vibration data.

27. A method according to claim 25, wherein, when the one or more sensors is located between the actuator and the desired area, the method comprises:
extrapolating the vibration data at the desired area based on the vibration data received from the one or more sensors; and
generating the drive signal using the extrapolated vibration data.

28. A method according to claim 25, wherein, when the one or more sensors is located beyond the desired area, the method comprises:
interpolating the vibration data at the desired area based on the vibration data received from the one or more sensors; and
generating the drive signal using the interpolated vibration data.

29. A method according to claim 19, comprising providing a plurality of actuators, each of the actuators being coupled to different areas of the structure and each of the actuators being configured to generate vibrations in the structure,
wherein generating a drive signal to drive the actuator comprises generating a plurality of drive signals, one for each of the plurality of actuators, each of the plurality of drive signals comprising a respective frequency chirp over a respective period of time,
wherein driving the actuator with the drive signal comprises driving each of the plurality of actuators with a respective drive signal to cause the structure to vibrate, and
wherein the wherein the frequency chirp and the first period of each of the drive signals are controlled such that the vibrations generated by the plurality of actuators propagate through the structure and coincide at a desired area of the structure remote from the actuators to remove ice from the desired area of the structure.

30. A method according to claim 29, comprising:
for each of the plurality of actuators, providing one or more sensors for sensing vibrations in the structure, the one or more sensors being located at or adjacent the desired area of the structure, and/or between the actuator and the desired area, and/or beyond the desired area; and receiving vibration data from the one or more sensors in response to vibrations in the structure caused by the actuator.

31. An method according to claim 30, wherein the drive signal is generated based on the vibration data received from the one or more sensors.

32. A method according to claim 31, wherein the drive signal is generated by:

for each actuator, driving the actuator with a calibration pulse to cause vibrations in the structure;

for each calibration pulse, receiving vibration data from the one or more sensors due to the vibrations in the structure caused by the calibration pulse from the actuator;

for each of the received vibration data, processing the received vibration data to generate the drive signal for each of the plurality of actuators.

33. A method according to claim 32, wherein the vibration data comprises a frequency chirp over a period of time for each of the plurality of actuators, and processing the received vibration data comprises time reversing the vibration data for each of the plurality of actuators.

34. A method according to claim 32, wherein, for each of the plurality of actuators, when the one or more sensors is located between the respective actuator and the desired area, the method comprises:

extrapolating the vibration data at the desired area based on the vibration data received from the one or more sensors; and generating the drive signal using the extrapolated vibration data.

35. A method according to claim 32, wherein, for each of the plurality of actuators, when the one or more sensors is located beyond the desired area, the method comprises:

interpolating the vibration data at the desired area based on the vibration data received from the one or more sensors; and generating the drive signal using the interpolated vibration data.

\* \* \* \* \*